US012560851B2

(12) United States Patent
Payne

(10) Patent No.: US 12,560,851 B2
(45) Date of Patent: Feb. 24, 2026

(54) SYSTEM AND METHOD FOR WAVELENGTH-SELECTIVE ATTENUATION AND MODULATION

(71) Applicant: SILICON LIGHT MACHINES CORPORATION, San Jose, CA (US)

(72) Inventor: Alexander Payne, Ben Lommond, CA (US)

(73) Assignee: SILICON LIGHT MACHINES CORPORATION, San Jose, CA (US)

( * ) Notice: Subject to any disclaimer, the term of this patent is extended or adjusted under 35 U.S.C. 154(b) by 468 days.

(21) Appl. No.: 17/893,057

(22) Filed: Aug. 22, 2022

(65) Prior Publication Data

US 2023/0068044 A1     Mar. 2, 2023

Related U.S. Application Data

(60) Provisional application No. 63/237,273, filed on Aug. 26, 2021.

(51) Int. Cl.
G02F 1/19 (2019.01)
G02B 27/10 (2006.01)

(52) U.S. Cl.
CPC ........... G02F 1/19 (2013.01); G02B 27/1006 (2013.01)

(58) Field of Classification Search
CPC .................................................. G02B 6/2931
See application file for complete search history.

(56) References Cited

U.S. PATENT DOCUMENTS

| | | | | |
|---|---|---|---|---|
| 6,698,902 B2 * | 3/2004 | Kawano | ............... | H04N 5/7458 359/254 |
| 7,092,599 B2 * | 8/2006 | Frisken | ............... | G02B 6/2931 385/24 |
| 7,397,980 B2 * | 7/2008 | Frisken | ............. | G02B 6/29383 385/24 |
| 8,285,131 B1 * | 10/2012 | Myatt | ............... | G02B 26/0808 396/20 |

(Continued)

OTHER PUBLICATIONS

International Search Report for International Application PCT/US20/33745 May 20, 2020.

(Continued)

*Primary Examiner* — Christopher Stanford
(74) *Attorney, Agent, or Firm* — William Nuttle

(57)     ABSTRACT
A system and method are provided for spectral shaping of light from a broadband source including multiple wavelengths. The system includes a beam splitter (BS) to receive and transmit an input beam, a dispersive element to disperse the input beam into dispersed beams separated by wavelength, and optic-elements to direct the dispersed beams onto a spatial light modulator (SLM). The SLM selectively modulates the dispersed beams reflected from the SLM, and the optic elements transmit a $0^{th}$-order of the reflected light through the dispersive element, which recombines the beams to form a reflected beam directed toward the BS. The BS separates the reflected beam from the input beam and directs it to an optical output of the system. The SLM includes multiple electrostatically deflectable reflective ribbons suspended over a reflective surface of a substrate, wherein the ribbons are separated by a distance equal to a width of the ribbons.

18 Claims, 9 Drawing Sheets

400

(56)                    References Cited

U.S. PATENT DOCUMENTS

| 10,677,994 | B2* | 6/2020 | Frisken | ................ | G02B 6/3512 |
| 2002/0176149 | A1 | 11/2002 | Davis et al. | | |
| 2008/0084605 | A1 | 4/2008 | Rothenberg et al. | | |
| 2011/0051216 | A1 | 3/2011 | Mackinnon et al. | | |
| 2014/0355095 | A1* | 12/2014 | Naftali | ............... | G02B 27/0006 |
| | | | | | 438/51 |
| 2018/0087931 | A1 | 3/2018 | Laman | | |
| 2020/0371344 | A1 | 11/2020 | Eng et al. | | |

OTHER PUBLICATIONS

Written Opinion of International Searching Authority Application PCT/US20/33745 May 20, 2020.

* cited by examiner

| Upper or Third Transmissive Layer 234 |
| Middle or Second Transmissive Layer 232 |
| Lower or First Transmissive Layer 230 |
| Absorber Layer 236 |
| 208/218 |

204/206

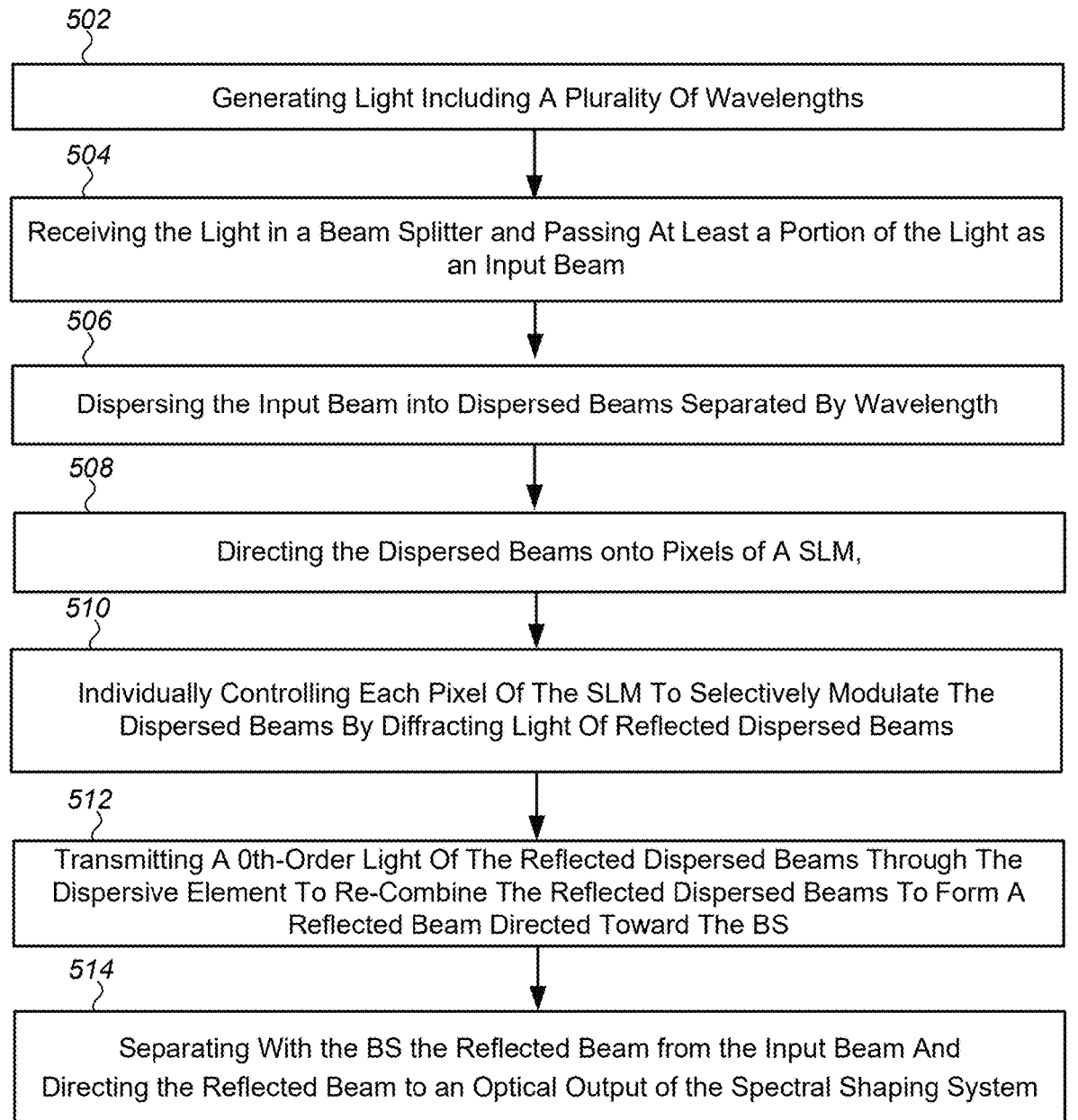

502

Generating Light Including A Plurality Of Wavelengths

504

Receiving the Light in a Beam Splitter and Passing At Least a Portion of the Light as an Input Beam

506

Dispersing the Input Beam into Dispersed Beams Separated By Wavelength

508

Directing the Dispersed Beams onto Pixels of A SLM,

510

Individually Controlling Each Pixel Of The SLM To Selectively Modulate The Dispersed Beams By Diffracting Light Of Reflected Dispersed Beams

512

Transmitting A 0th-Order Light Of The Reflected Dispersed Beams Through The Dispersive Element To Re-Combine The Reflected Dispersed Beams To Form A Reflected Beam Directed Toward The BS

514

Separating With the BS the Reflected Beam from the Input Beam And Directing the Reflected Beam to an Optical Output of the Spectral Shaping System

*FIG. 5*

SYSTEM AND METHOD FOR WAVELENGTH-SELECTIVE ATTENUATION AND MODULATION

CROSS-REFERENCE TO RELATED APPLICATIONS

This application claims the benefit of priority under 35 U.S.C. 119(e) to U.S. Provisional Patent Application Ser. No. 63/237,273, filed Aug. 26, 2021, which is incorporated by reference herein in its entirety.

TECHNICAL FIELD

This disclosure relates generally relates to systems and methods for wavelength-selective attenuation and modulation, and more particularly to a spectral shaping for modulating a broadband light source including a microelectromechanical systems based spatial light modulator, and methods for operating the same.

BACKGROUND

Spatial light modulators (SLMs) are used in a number of applications including fiber-optic communications, printing, projection or display, additive manufacturing and metrology and inspection systems used to fabricate Microelectromechanical systems (MEMS) and semiconductor devices. Typically, SLMs used in these applications are designed to work efficiently over a single or narrow range of light frequencies or wavelengths, and require an expensive narrow-band or coherent light source.

One type of SLM particularly useful in the aforementioned applications is an active ribbon-type MEMS-based SLM.

FIGS. 1A and 1B show an embodiment of a ribbon-type MEMS-based SLM suitable for use in the aforementioned systems and applications, such as a Flat Light Valve or FLV commercially available from Silicon Light Machines, in San Jose, California. By flat it is meant that the FLV includes a large number of closely spaced alternating active and stationary active ribbons, each having a reflective top surface, and thus providing the SLM with flat surface.

Referring to FIGS. 1A and 1B, a FLV 100 generally includes a number of ribbons 102a, 102b; each having a light reflective surface 104a, 104b, supported over a surface 106 of a substrate 108. The number of ribbons includes a number of stationary or static bias ribbons 102a interlaced with movable or active ribbons 102b deflectable through a gap or cavity 110 toward the substrate 108 to form an addressable diffraction grating with adjustable diffraction strength. The active ribbons 102b are deflected towards the surface 106 of the substrate 108 by electrostatic forces generated when a voltage is applied between ribbon electrodes 112 in the active ribbons 102b and a base or substrate electrode 114 formed in or on the surface of the substrate 108.

FIG. 1B shows a schematic sectional side view of the FLV 100 of FIG. 1A. Referring to FIG. 1B, each stationary active ribbon 102a includes a mechanical layer 116 on or from which the reflective surface 104a is formed. Each active ribbon 102b includes a tensile or elastic mechanical layer 118 to support the active ribbon above the surface 106 of the substrate 108, a conducting layer forming a ribbon electrode 112 and a top reflective layer 120 on or from which the reflective surface 104b is formed.

Referring again to FIG. 1B, light from a narrow band or single frequency light source is projected or imaged onto the FLV 100 so that light reflected from the stationary ribbons 102a adds as vectors of magnitude and phase with that reflected from the displaced active ribbons 102b, thereby modulating light reflected from the FLV 100 from fully reflected to fully diffracted or extinguished. By fully reflected it is meant that in $0^{th}$-order application or mode the reflected light from the active ribbons 102b is the same phase or constructively interferes with that from the stationary active ribbons 102a. However, in a FLV 100 operating in a $0^{th}$-order mode light is also reflected from the surface 106 of the substrate 108 through gaps between the stationary ribbons 102a and active ribbons 102b, limiting a contrast that can be achieved between the fully reflected and fully diffracted state to less than about 50:1. This degree or level of contrast is insufficient for many of the application noted above, particularly those requiring fine detail or precise borders between light and dark areas of an image produced by the FLV 100.

Accordingly, there is a need for a spectral shaping system including a MEMS-based SLM having high $0^{th}$-order contrast and optical efficiency, and methods of using the same to modulate light from a broadband light source to produce a spectrally shaped output for applications requiring a coherent or narrow range light.

SUMMARY

Systems and methods are provided for spectrally shaping light from a broadband source using a spatial light modulator (SLM).

The system can include a broadband light source operable to generate a light including multiple wavelengths, a beam splitter (BS) operable to receive and pass at least a portion of the light as an input beam; a dispersive element to receive and disperse the input beam into a number of dispersed beams separated by wavelength; and optic elements including a number of lenses or mirrors to direct the dispersed beams onto a spatial light modulator (SLM) operable to selectively modulate the number of dispersed beams incident thereon based on wavelength. The optic elements are further operable to transmit a $0^{th}$-order light of the dispersed beams reflected from the SLM through the dispersive element. The dispersive element is further operable to recombine the reflected dispersed beams to form a reflected beam directed toward the BS, and the BS is operable to separate the reflected beam from the input beam and direct the reflected beam to an optical output of the spectral shaping system.

Generally, the SLM is a MEMS-based dynamically adjustable diffraction grating, including a plurality of electrostatically deflectable reflective active ribbons suspended over a reflective surface of a substrate, wherein each of the active ribbons are separated by a distance equal to a width of the active ribbons. In one embodiment the SLM is a 'true' Grating or Grated Light Valve (GLV™) commercially available from Silicon Light Machines, Inc., of San Jose, California. By true GLV™ it is meant a MEMS-based diffractive SLM including multiple movable or active ribbons suspended over a reflective surface of or on a substrate, each having a reflective surface thereon, and each separated from at least one adjacent active ribbon by a distance equal to a width of each of the plurality of active ribbons, without stationary or static bias ribbons therebetween.

BRIEF DESCRIPTION OF THE DRAWINGS

Embodiments of the invention will now be described, by way of example only, with reference to the accompanying schematic drawings in which corresponding reference symbols indicate corresponding parts. Further, the accompanying drawings, which are incorporated herein and form part of the specification, illustrate embodiments of the present invention, and, together with the description, further serve to explain the principles of the invention and to enable a person skilled in the relevant art(s) to make and use the invention.

FIG. 5 is a flowchart of a method for operating a spectral shaping system according to an embodiment of the present disclosure.

Figure 1A:
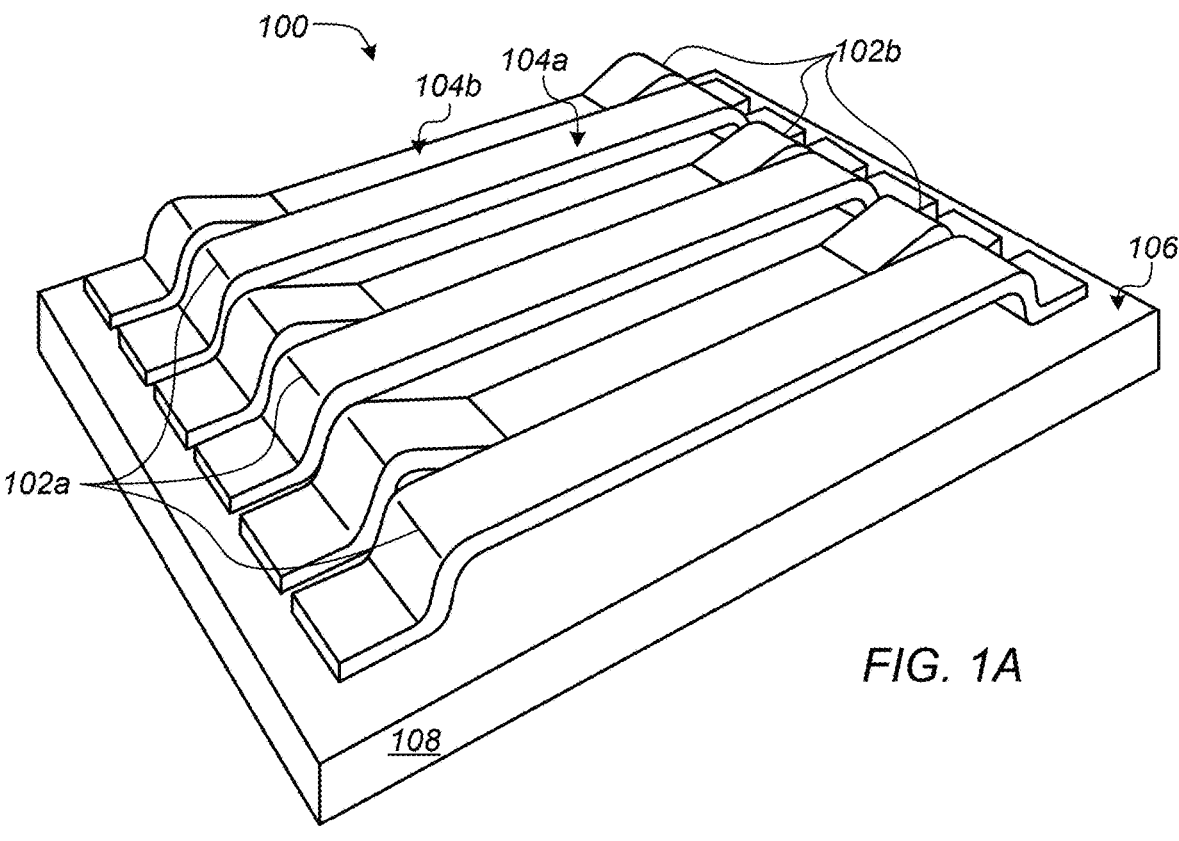
FIG. 1A is a perspective view of a portion of a Micro-Electromechanical Systems (MEMS) based a Flat Light Valve (FLV) including both active and stationary active ribbons.
Figure 1B:
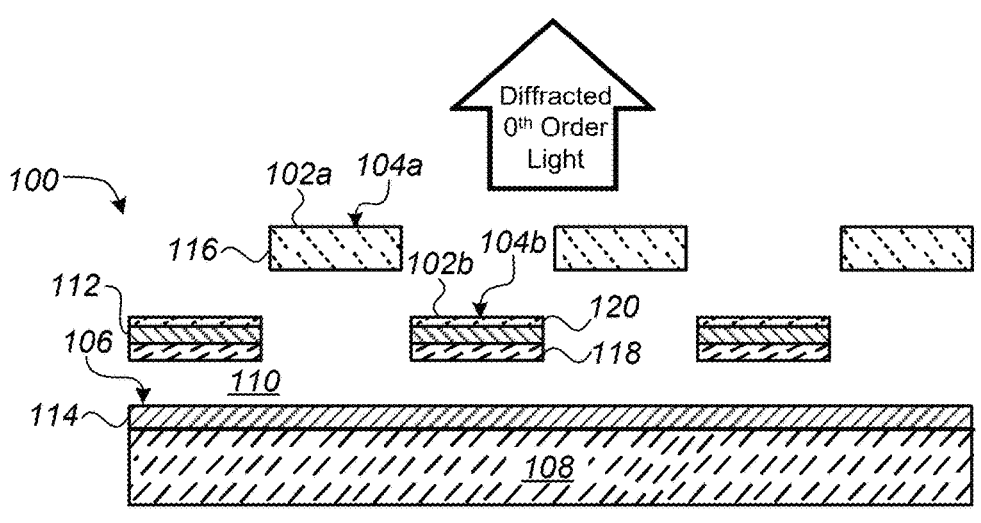
FIG. 1B is a schematic block diagram of a sectional side view of the portion of the a FLV of FIG. 1A in an active or diffraction state.

The features and advantages of embodiments of the present invention will become more apparent from the detailed description set forth below when taken in conjunction with the drawings. In the drawings, like reference numbers generally indicate identical, functionally similar, and/or structurally similar elements.

DETAILED DESCRIPTION

Embodiments of a spectral shaping system and methods for operating the same for wavelength selective attenuation and modulation of light from a broadband source to produce high contrast images using a microelectromechanical systems (MEMS) based diffractive spatial light modulator (SLM).

In the following description, numerous specific details are set forth, such as specific materials, dimensions and processes parameters etc. to provide a thorough understanding of the present invention. However, particular embodiments may be practiced without one or more of these specific details, or in combination with other known methods, materials, and apparatuses. In other instances, well-known semiconductor design and fabrication techniques have not been described in particular detail to avoid unnecessarily obscuring the present invention. Reference throughout this specification to "an embodiment" means that a particular feature, structure, material, or characteristic described in connection with the embodiment is included in at least one embodiment of the invention. Thus, the appearances of the phrase "in an embodiment" in various places throughout this specification are not necessarily referring to the same embodiment of the invention. Furthermore, the particular features, structures, materials, or characteristics may be combined in any suitable manner in one or more embodiments.

The terms "over," "under," "between," and "on" as used herein refer to a relative position of one layer with respect to other layers. As such, for example, one layer deposited or disposed over or under another layer may be directly in contact with the other layer or may have one or more intervening layers. Moreover, one layer deposited or disposed between layers may be directly in contact with the layers or may have one or more intervening layers. In contrast, a first layer "on" a second layer is in contact with that second layer. Additionally, the relative position of one layer with respect to other layers is provided assuming operations deposit, modify and remove films relative to a starting substrate without consideration of the absolute orientation of the substrate.

Briefly, the spectral shaping system includes a broadband light source configured or operable to generate a collimated beam light including a plurality of wavelengths, a beam splitter (BS) configured or operable to receive and pass at least a portion of the collimated beam, optic elements including one or more lenses, mirrors, and a dispersive element, such as a prism, to disperse the collimated beam into a number of dispersed beams separated by wavelength, and a SLM operable receive the number of dispersed beams imaged from the optic elements and to selectively attenuate or modulate by wavelength. The optic elements are further operable to recombine beams reflected from the SLM through the same prism, lenses or mirrors by a reverse path, and the BS is operable to separate the reflected beam from the collimated beam.

An embodiment of a MEMS-based diffractive SLM, known as a 'true' Grating or Grated Light Valve (GLV™) commercially available from Silicon Light Machines, Inc., of San Jose, California, which is particularly advantageous for use in and with spectral shaping systems and methods of the present disclosure will now be shown and described with reference to FIGS. 2A through 2E. By true GLV™ it is meant a MEMS-based diffractive SLM including multiple movable or active ribbons suspended over a reflective surface of or on a substrate, each having a reflective surface thereon, and each separated from at least one adjacent active ribbon by a distance equal to a width of each of the plurality of active ribbons, without stationary or static bias ribbons therebetween. Generally or preferably, the reflective surfaces on the active ribbons and the reflective surfaces on the substrate exposed between adjacent active ribbons are sized and shaped to define substantially equal areas so that $0^{th}$-order light reflected from the active ribbons and the adjacent areas of reflective surface of the substrate therebetween can be modulated or attenuated from fully reflected to fully diffracted or extinguished.

Figure 2A:
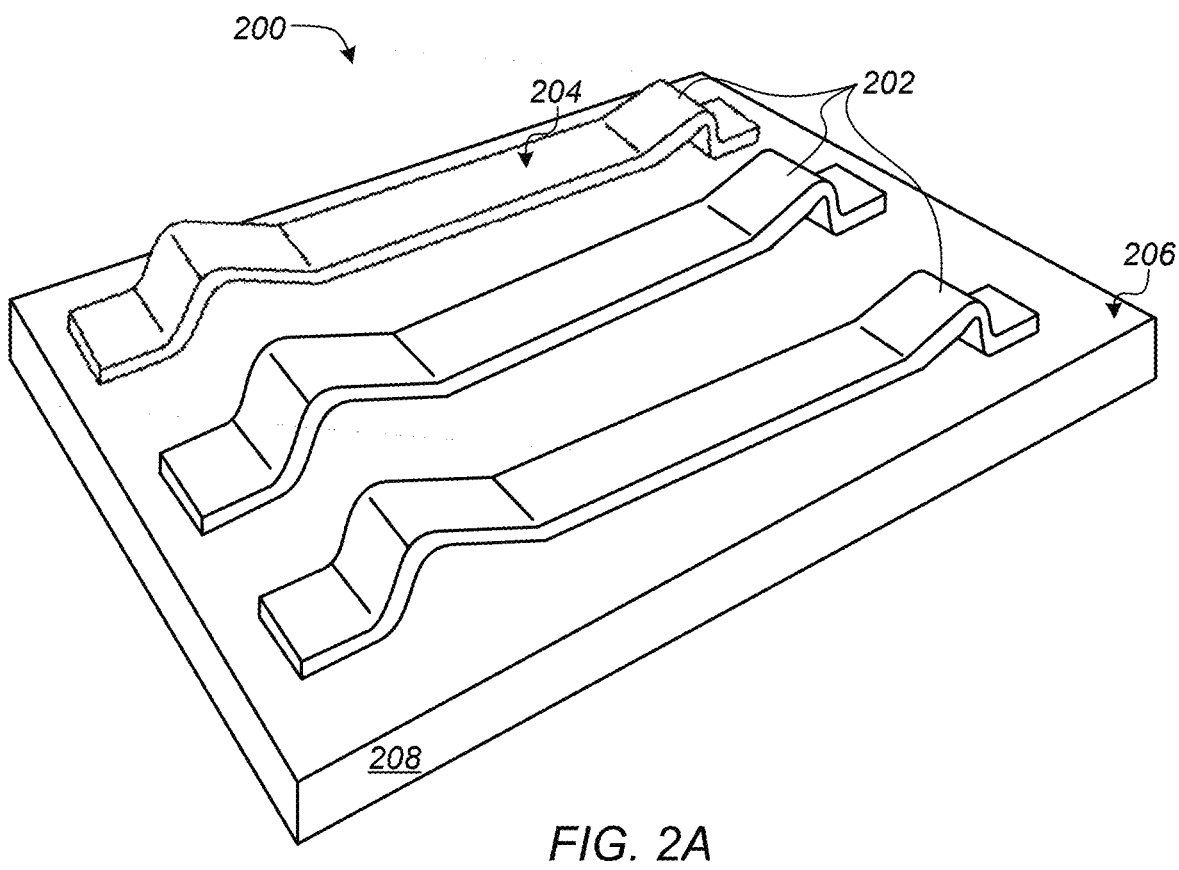
FIG. 2A is a perspective view of a portion of a Micro-Electromechanical Systems (MEMS) based spatial light modulator (SLM) including only active ribbons that is particularly useful for wavelength-selective attenuation and modulation.
Figure 2B:
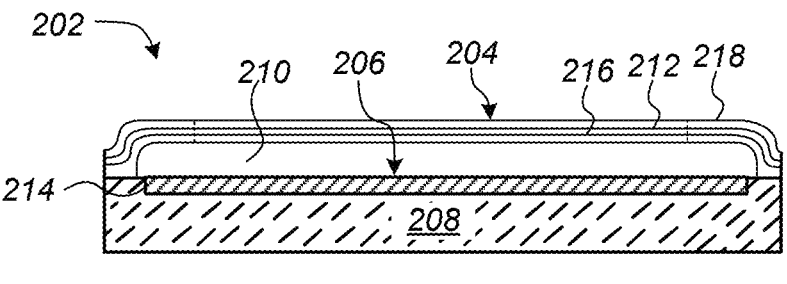
FIG. 2B is a schematic block diagram of a sectional side view of an active ribbon of the SLM of FIG. 2A in a quiescent or undriven state along an axis parallel to a long axis of the active ribbon.

Referring to FIGS. 2A and 2B, the MEMS-based diffractive SLM 200 generally includes a dynamically adjustable diffraction grating formed by multiple, electrostatically displaceable or active ribbons 202, each having a light reflective surface 204 and supported over a surface of a substrate 208 having a number of reflective surfaces 206 formed thereon. Each of the active ribbons 202 is separated from at least one adjacent active ribbon by a distance equal to a width of each of the plurality of active ribbons, without any stationary or static bias ribbons therebetween. The reflective surfaces 204 on the active ribbons 202 and the reflective surfaces 206 on the substrate exposed between adjacent active ribbons are sized and shaped to define substantially equal areas so that $0^{th}$-order light reflected from the active ribbons and the adjacent areas of reflective surface of the substrate therebetween can be modulated or attenuated from fully reflected to fully diffracted or extinguished.

The active ribbons 202 are movable or deflectable through a gap or cavity 210 toward the substrate 208 to form an addressable diffraction grating with adjustable diffraction strength. It is note that while only three active ribbons 202 are shown in FIG. 2A, generally the SLM 200 includes a linear array composed of hundreds to thousands of free-standing, individually addressable electrostatically actuated active ribbons, each having a light reflective surface 204. The reflective surfaces 204 on the active ribbons 202 and the reflective surface or surfaces 206 on the substrate 208 can include or be formed from a dielectric mirror (as explained in greater detail below), or from a thin layer of a reflective metal, such as aluminum. The reflective surfaces 206 on the surface of the substrate can include a single, undivided reflective surface substantially covering the entire surface of the substrate 208 and underlying all of the active ribbons 202 of the linear array of the SLM 200, or a number of separate reflective surfaces on the surface of the substrate exposed between the active ribbons.

The active ribbons 202 are deflected towards the surface of the substrate 208 by electrostatic forces generated when a voltage is applied between ribbon electrodes 212 in the deflectable active ribbons 202 and a base or substrate electrode 214 (shown in FIG. 2B) formed in or on the substrate. The ribbon electrode 212 and substrate electrode 214 can include any suitable conducting or semiconducting material compatible with standard MEMS fabrication technologies. For example, the ribbon electrode 212 and substrate electrode 214 can include an amorphous or polycrystalline silicon-layer, a titanium-nitride (TiN) layer, silicon-germanium (SiGe) or a metal, such as aluminum. The applied voltages are controlled by drive electronics (not shown in these figures), which may be integrally formed in or on the surface of the substrate 208 below or adjacent to the active ribbons 202 and electrically connected through interconnects, and vias. Light reflected from the active ribbons 202 adds as vectors of magnitude with that reflected from the reflective surface 206 beneath and laterally adjacent to the active ribbon, thereby modulating light reflected from the SLM 200.

A schematic sectional side view of a movable or active ribbon 202 of the SLM 200 of FIG. 2A taken along a longitudinal axis or the active ribbon is shown in FIG. 2B. Referring to FIG. 2B, the active ribbon 202 generally includes an elastic mechanical layer 216 to support the active ribbon above the surface of the substrate 208, the ribbon electrode 212 and the reflective surface 204 overlying the mechanical layer and ribbon electrode. In some embodiments, such as that shown in FIG. 2B, the reflective surface 204 on the active ribbon 202 is formed on a separate mirror or reflective layer 218 discrete from and overlying the mechanical layer 216 and the ribbon electrode 212. In some embodiments, where the reflective surface 204 includes or is formed from a metal, the reflective layer 218 is a layer of metal, such as aluminum, and can also serve as the ribbon electrode 212.

Generally, the mechanical layer 216 comprises a taut silicon-nitride (SiN) or silicon-germanium (SiGe) film or layer, and flexibly supported above the surface of the substrate 208 by a number of posts or structures, typically also made of silicon-nitride or silicon-germanium, at both ends of the active ribbon 202. The ribbon electrode 212 can be formed over and in direct physical contact with the mechanical layer 216, as shown, or underneath the mechanical layer.

The separate, discrete reflective layer 218, where included, can include any suitable metallic, dielectric or semiconducting material compatible with standard MEMS fabrication technologies, and capable of being patterned using standard lithographic techniques to form the reflective surface 204.

Figure 2C:
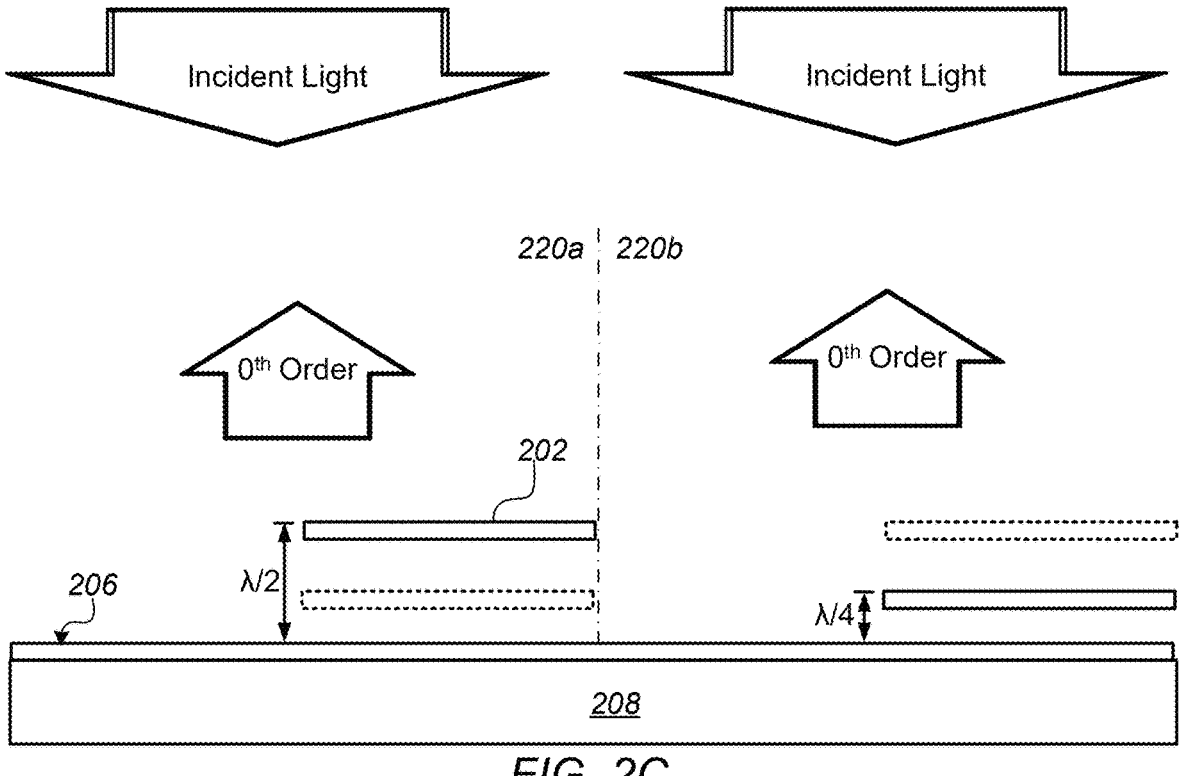
FIG. 2C is a schematic block diagram of a sectional side view of the SLM of FIG. 2A along an axis transverse to the long axis of the active ribbon.

FIG. 2C is a schematic block diagram of a sectional side view of a portion of the SLM 200 along an axis transverse to the long axis of the active ribbons 202, and two pixels 220a, 220b, each pixel consisting of one active ribbon and a portion of the reflective surface 206 on the substrate 208 exposed between adjacent active ribbons. Referring to FIG. 2C, the first pixel 220a is in a quiescent or reflective state with a separation between the reflective surface 204 of the active ribbon and the reflective surface 206 on the substrate 208 are separated by distance or gap equal to an even number of one quarter (¼) wavelengths (shown here as λ/2) of the wavelength of light incident thereon. The second pixel 220b is in an active or diffracted state with a separation between the reflective surface 204 of the active ribbon and the reflective surface 206 on the substrate 208 are separated by distance or gap equal to an odd number of one quarter (¼) wavelengths (shown here as λ/4) of the wavelength of an incident light. It is noted that although each pixel is shown here as consisting of as a single active ribbon 202 and adjacent portion of the underlying reflective surface 206 that need not be the case in every embodiment, and that a single pixel can include multiple active ribbons electrically ganged together to be operated in unison along with adjacent portions of the underlying reflective surface. It is further noted that the incident light illuminating each pixel need not have the same wavelength, thus the active ribbons in separate pixel can be deflected by differing amounts, while both are in a fully reflected state, a fully diffracted state or anywhere therebetween.

Figures 2D, 2E:
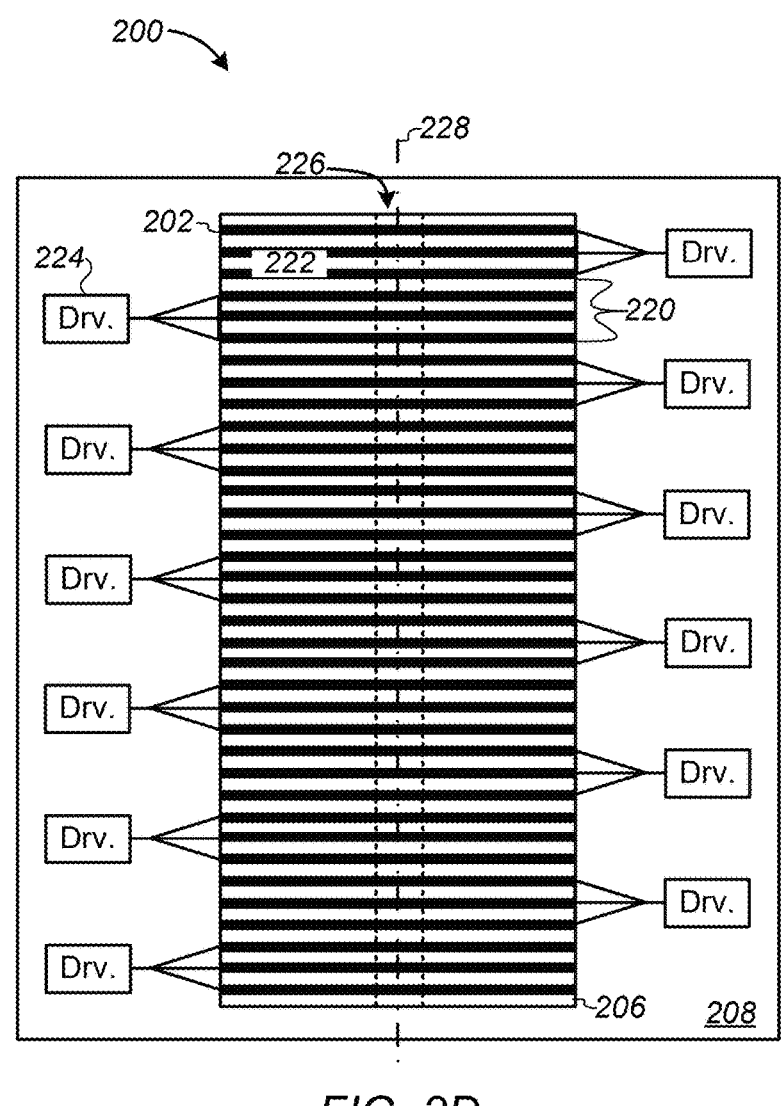
FIG. 2D is a schematic block diagram of the SLM of FIG. 2A including a linear array of active ribbons.
FIG. 2E schematic sectional side view of a stack of layers in a dielectric or Bragg mirror for use in the true diffraction grating of FIG. 2A.

FIG. 2D shows a SLM 200 including a 1-dimensional (1D) or linear array 222 a large number of active ribbons 202, each paired with a portion of the reflective surface 206 beneath and laterally adjacent to the active ribbon. In the embodiment shown, the ribbon electrodes 212 (not shown in this figure) of several adjacent active ribbons 202, are ganged under action of a single channel or driver 224 of drive electronics to form a single pixel 220 of the SLM 200. Again, although shown as including only several dozen active ribbons 202 spaced apart and suspended over the reflective surface 206 of the substrate 208, it is noted that the linear array 222 is generally composed of hundreds to thousands of free-standing, individually addressable electrostatically actuated active ribbons 202 grouped together into a number of pixels 220 each having from one to ten or more active ribbons. Assembling a large number of pixels 220 and drivers 224 results a continuous, programmable diffraction grating, in which a number of dispersed beams of light separated by wavelength and shaped or focused into a line of illumination 226 along a long axis 228 of the linear array 222 are selectively modulated or attenuated by a number of pixels 220.

In one embodiment, shown in FIG. 2E, the reflectors or reflective surfaces 204 on the reflective layer 218 of the active ribbons 202 or the reflective surface 206 of the substrate 208 are distributed, dielectric or Bragg mirrors including a stack of flexible transmissive layers with different optical characteristics or properties, such as reflection, transmission and absorption. Referring to FIG. 2E, the Bragg mirror (reflective surfaces 204/206) includes a first or lower transmissive layer 230 overlying the active ribbons 202 and/or surface of the substrate 208, a middle transmissive layer 232 on the first or lower transmissive layer, and a third or top transmissive layer 234 on the second or middle transmissive layer. The thicknesses of these layers are adjusted so as to comprise one quarter wave of the wave of the target wavelength. Suitable materials for the transmissive layers can include poly-crystalline silicon, silicon-oxide, silicon-carbide, aluminum-arsenide, zirconium-oxide and titanium-oxide. Optionally, in certain embodiments, such as that shown in FIG. 2E, the Bragg mirror (reflective surfaces 204/206) further includes an absorbing layer 236 to absorb and re-emit, or reflect incident light. Suitable materials for the absorbing layer 236 can include metallic films as well as native or doped semiconductors. The enhanced reflectivity of stack of two or more transmissive layers over an absorbing layer reduces or substantially eliminates degradation of the MEMS-based modulator as a consequence of high laser fluence.

Figures 3A, 3B, 3C:
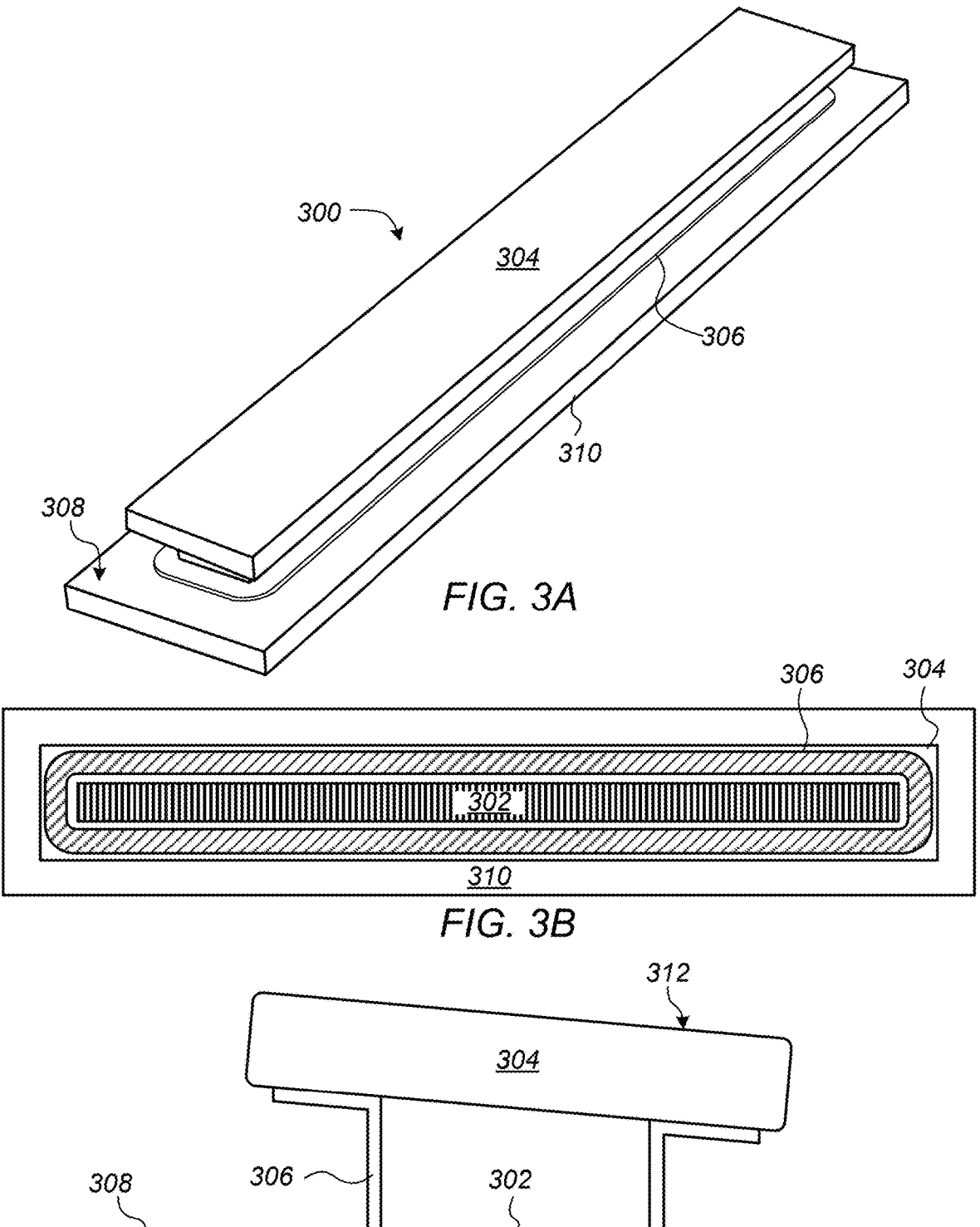
FIG. 3A is a perspective view of a portion of a wafer level package for the SLM of FIGS. 2A-2E, including a tilted window or optically transparent cover.
FIG. 3B is a planar top view of the wafer level package of FIG. 3A.
FIG. 3C is a schematic block diagram of a sectional side view of the wafer level package of FIG. 3A.

As illustrated in FIGS. 3A to 3C the SLM 302 of FIGS. 2A-2E can be enclosed in a wafer level package 300 having a transparent cover or window 304 through which incident and reflected light can be passed while protecting the SLM from environmental contamination during manufacture and operation. The window 304 can be made of glass or other optically transparent material, and is substantially planar with an upper surface angled or tilted at about 5° relative to the reflective surfaces of the SLM 302 to reduce or substantially eliminate reflections of incident light from the window, which could interfere with the modulated light and reduce contrast of the SLM when operating in $0^{th}$-order. FIG. 3A is a perspective view of one embodiment of the wafer level package 300 includes in addition to the window 304, a rectangular spacer 306 that surrounds the SLM 302. Generally, the spacer 306 is made from a metallic, ceramic or other dielectric material, and is soldered or otherwise hermetically sealed to a surface 308 of a substrate 310 on which the SLM 302 is formed prior to singulating or dicing the substrate. Preferably, the window 304 is also hermetically sealed to the spacer 306. FIG. 3B is a planar top view of the SLM 302 enclosed in the wafer level package 300 of FIG. 3A following singulation or dicing of the substrate 310. FIG. 3C is a schematic block diagram of a sectional side view the wafer level package 300 of FIG. 3A.

In some embodiments, the wafer level package 300 further includes an anti-reflective coating (ARC 312) on the top surface of the window 304 to further reduce reflections therefrom. The ARC 312 can be formed by depositing one or more thin optically transparent layers of silicon nitride (SiNx), silicon oxide (SiOx) and/or titanium dioxide (TiO2), after hermitically sealing the window 304 to the spacer, either before or after singulation or dicing of the substrate 310.

Various embodiments of a spectral shaping system for wavelength-selective attenuation and modulation of light from a broadband source using a true diffraction grating, such as the MEMS-based diffractive SLM of FIGS. 2A to 2E and 3, will now be described with reference to FIGS. 4A through 4D.

Figure 4A:
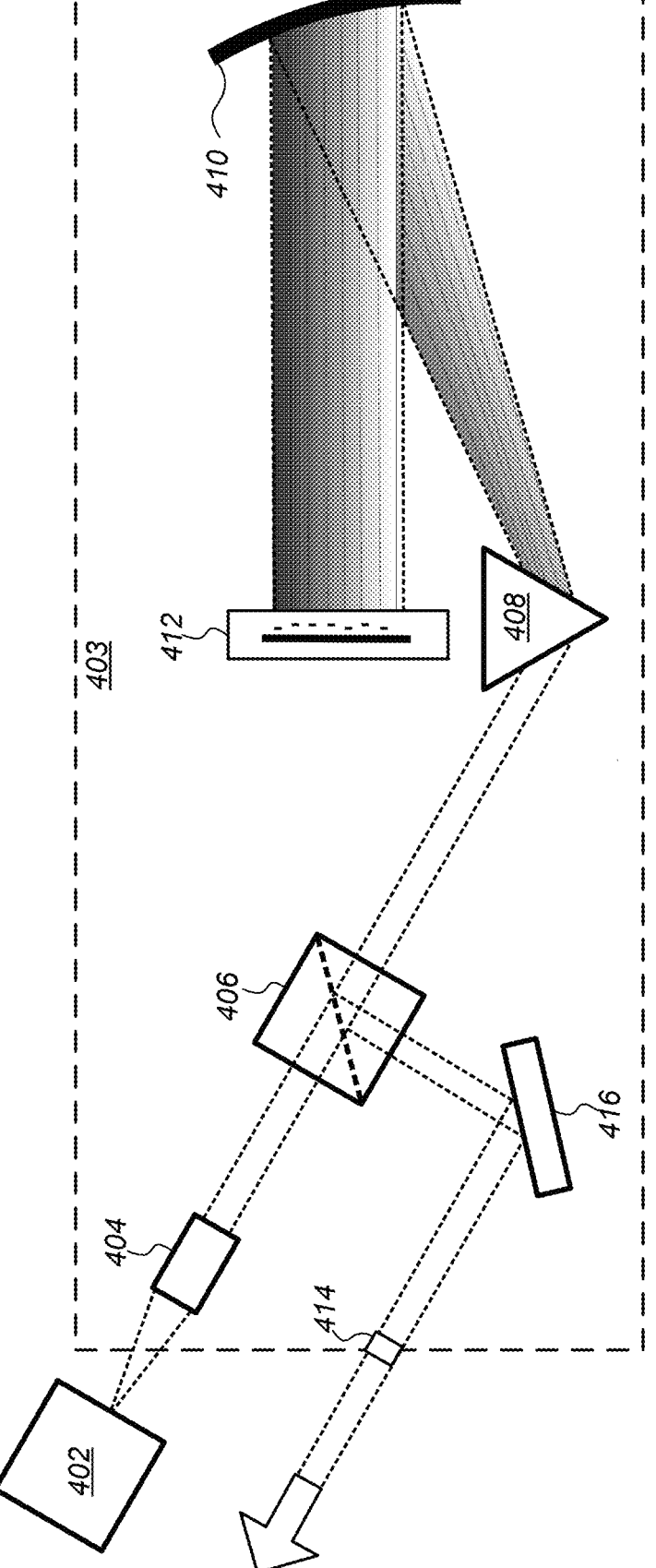
FIGS. 4A to 4D are block diagram of a spectral shaping system for wavelength-selective attenuation and modulation of light from a broadband source using a true diffraction grating according to embodiments of the present disclosure.

Referring to FIG. 4A, in a first embodiment the spectral shaping system 400 includes a broadband light source 402 capable of generating light including multiple wavelengths, and a spectral shaper 403 capable of selectively modulating and attenuating individual wavelengths of light from the broadband light source based on the wavelength. The broadband light source 402 can include one or more light emitting diodes (LEDs), laser diodes (LDs) or a supercontinuum laser, and is generally operable to generate light having wavelengths between 200 nm-2 μm, or a subset thereof.

The spectral shaper 403 generally includes a collimating lens 404 to collimate light from the broadband light source 402 to form a collimated input beam, a beam splitter (BS 406) to receive and pass at least a portion of the input beam to optic elements including a light dispersing or dispersive element 408, such as a prism or a static diffraction grating, configured or operable to disperse the input beam into a number of dispersed beams separated by wavelength, and a collimating element including one or more lenses or mirrors, such as a concave or collimating mirror 410, to project or direct the dispersed beams onto one or more of the pixels a SLM 412 capable of operating as a true diffraction grating to receive the number of dispersed beams imaged from the optic elements and to selectively attenuate or modulate by wavelength. Generally, the SLM 412 is a MEMS-based dynamically adjustable diffractive grating including a large number of electrostatically deflectable, reflective micro-ribbons interspersed by reflective areas on an underlying substrate, such as the 'true' GLV™ described above with respect to FIGS. 2A-2E. Optionally, as shown and described above with reference to FIGS. 3A and 3B, the SLM 412 is encapsulated in a wafer level package 300 having a window 304 through which incident and reflected or modulated dispersed beams can be transmitted or passed, and which is or tilted at about 5° relative to the reflective surfaces of the SLM 412 to reduce or substantially eliminate reflections of incident light from the window.

The number of the optic elements, including the collimating mirror 410 and dispersive element 408, are further operable or configured to re-direct the modulated or reflected dispersed beams reflected from the SLM 412 through the dispersive element 408 by a reverse path where reflected dispersed beams are recombined to form a single, reflected output beam or reflected beam directed to the BS 406. Generally, the reflected beam is coaxial with the input beam and the BS 406 is further operable to separate the reflected beam from the input beam and to optically couple or direct the reflected beam to an optical output 414 of the spectral shaping system 400. Optionally, the light path of the reflected beam to the optical output 414 can include a second number of optic elements including one or more lenses, apertures or output mirrors 416 to collimate and or direct the reflected beam toward the optical output.

Figure 4B:
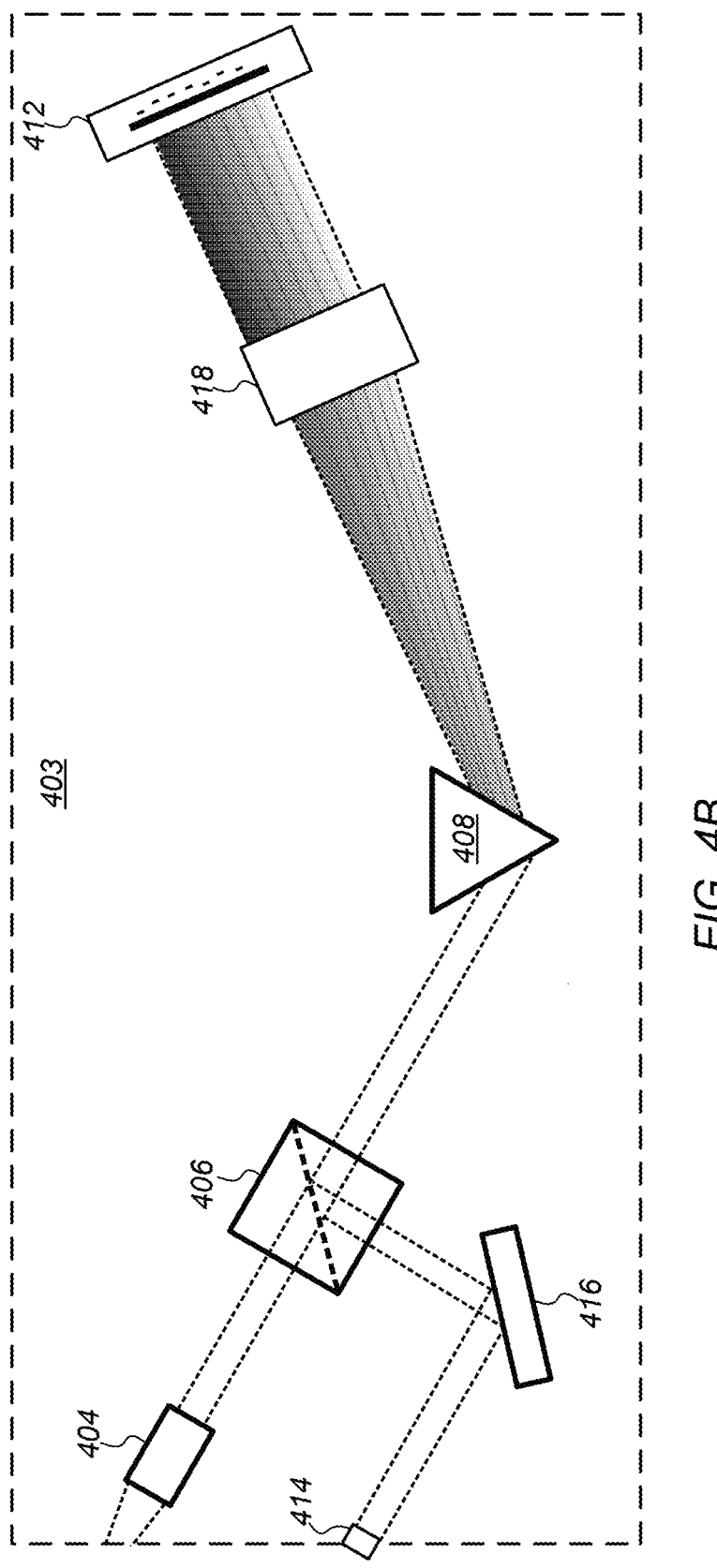

In another embodiment, shown in FIG. 4B the collimating mirror 410 can be replaced by a transmissive collimating element, such as a collimating lens 418, operable or configured to project or direct the dispersed beams onto one or more of the pixels a SLM 412 and further operable to re-direct the modulated or reflected dispersed beams reflected from the SLM 412 through the dispersive element 408 by a reverse path where reflected dispersed beams are recombined to form the reflected output beam or reflected beam directed to the BS 406.

Figure 4C:
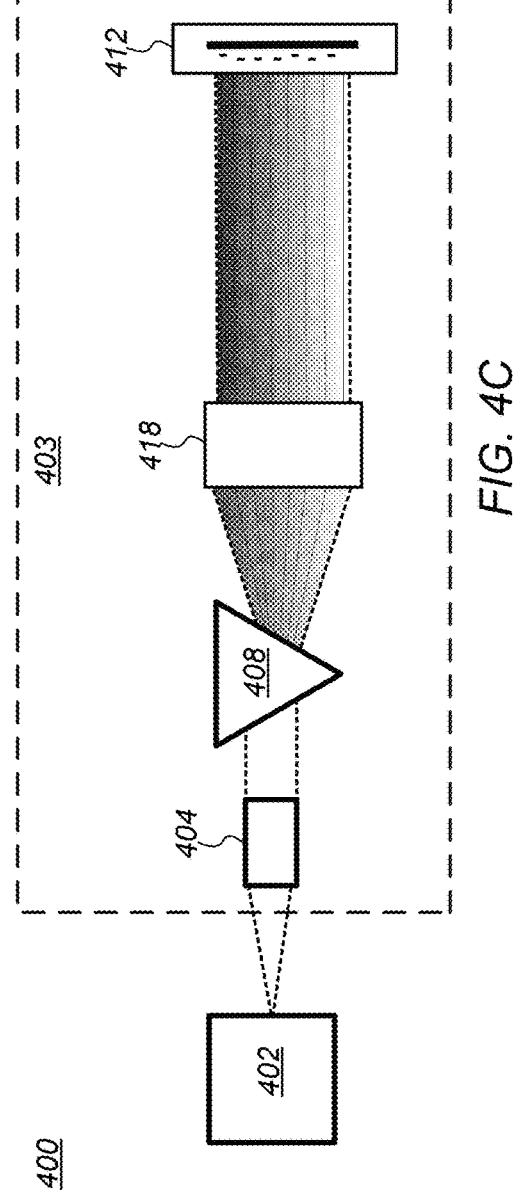
Figure 4D:
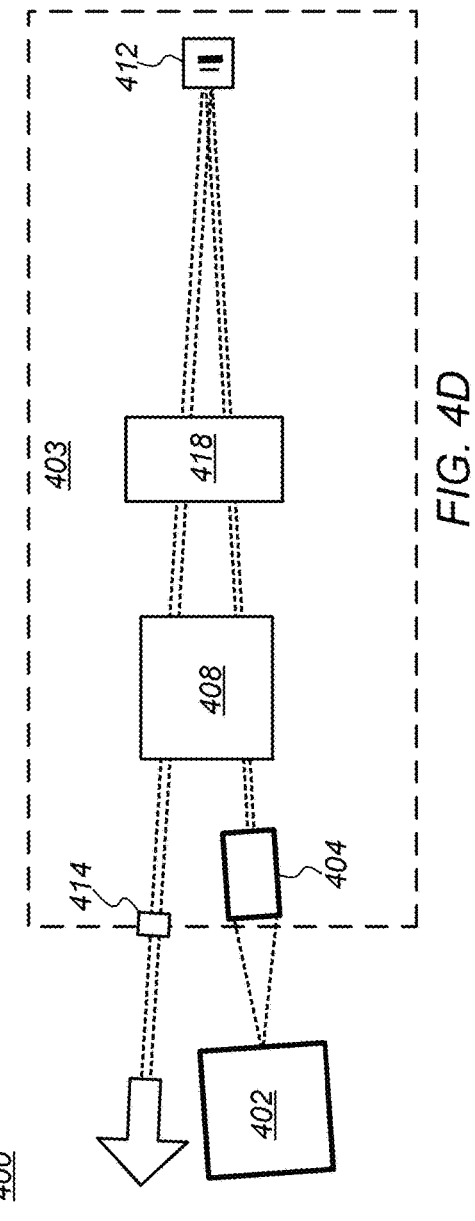

In yet another embodiment, illustrated in FIGS. 4C and 4D an angle of incidence of the dispersed beams projected onto the SLM 412 is slightly different from or at an acute angle relative to a long axis or non-diffracting direction of the SLM, and to an angle of reflected dispersed beams reflected from the SLM. FIG., eliminating the need for a beam splitter (BS 406). FIG. 4C is a side view of the spectral shaping system 400 taken parallel to a long axis of the SLM 412. Referring to FIG. 4C, similar to the embodiment of FIG. 4B the spectral shaper 403 generally includes a colli- mating lens 404 to collimate light from the broadband light source 402 into an input beam, a dispersive element 408, such as a prism or a static diffraction grating, to disperse the input beam into a number of dispersed beams separated by wavelength, a collimating lens 418 project or direct the dispersed beams onto one or more of the pixels a SLM 412, and, although not shown in FIG. 4C, an optical output 414 of the spectral shaping system 400. FIG. 4D is a top view of the spectral shaping system 400 of FIG. 4C taken perpen- dicular to the long axis of the SLM 412. Referring to FIG. 4D, it is seen that reflected dispersed beams reflected from the SLM 412 are transmitted through the collimating lens 418 to the dispersive element 408 where they are recom- bined to form a single, reflected output beam or reflected beam directed to the optical output 414 of the spectral shaping system 400.

FIG. 5 is a flowchart of a method for selectively attenu- ating and modulating based on wavelength light from a broadband source using a spectral shaping system such as described above with reference to FIG. 4A. Referring to FIG. 5 the method begins with generating light including a plurality of wavelengths (502). As noted above the light can be generated using one or more broadband light sources, such LEDs, or a supercontinuum laser.

Next, the light is received in a beam splitter (BS) and at least a portion of the light passed or transmitted as an input beam in a direction parallel to or coaxial with the incoming light from the broadband source (504). Optionally, as shown in FIG. 4A, the light can be collimated into an input beam prior to being received in the BS using, for example, a collimating lens.

The input beam is then separated or dispersed into a number of dispersed beams separated by wavelengths using a dispersion element, such as a prism or static diffraction grating (506). The angle-dispersed wavelengths are colli- mated for presentation onto the SLM using either a colli- mating mirror, as shown in FIG. 4A, or a collimating lens, as shown in FIG. 4B.

The number of dispersed beams are then focused or re-directed onto a plurality of pixels of a MEMS-based SLM (508). Generally, the SLM is a MEMS-based dynamically adjustable diffraction grating, including a plurality of elec- trostatically deflectable reflective active ribbons suspended over a reflective surface of a substrate, wherein each of the active ribbons are separated by a distance equal to a width of the active ribbons. In one embodiment the SLM is a 'true' GLV™ as described above with reference to FIGS. 2A-D. Optionally, the number of dispersed beams can focused onto the pixels of the SLM using a by means of a focusing lens.

Each pixel of the SLM can then be individually controlled to selectively modulate the dispersed beam incident thereon by diffracting light of reflected dispersed beams (510). As noted above the light is diffracted by constructive or destruc- tive interference between light reflected from surfaces of the active ribbons in the pixel and laterally adjacent reflective surfaces on the substrate. Optionally, individually control- ling each pixel of the SLM to selectively modulate the number of dispersed beams includes setting each pixel to a fully reflective or fully extinguished quiescent state based on a wavelength of a dispersed beam incident thereon by applying a wavelength dependent calibration voltage.

A $0^{th}$-order light of the reflected dispersed beams is then directed towards and through the dispersive element to recombine the reflected dispersed beams to form a reflected beam directed toward the BS (512). Where the spectral shaping system includes a prism and a collimating mirror, as shown in FIG. 4A, the light output or reflected from the SLM is redirected towards the prism using the mirror.

Finally, the reflected beam is separated from the input beam using the BS, and at least a portion of the reflected beam directed to an optical output of the spectral shaping system and directed toward an imaging plane (514). The imaging plane can include or be on a surface on a workpiece, a surface of a display or screen, or a sensor array of a spectrometer. Generally, as shown in FIG. 4A, the colli- mated output is directed toward the imaging plane using a second or output mirror. Optionally, the output mirror can be part of a scanning system or scanner operable to scan or sweep the output beam in one or more directions over the imaging plane.

The spectral shaping system disclosed above is useful in a wide range of applications requiring coherent light or light having a narrow band of wavelengths at a specified optical power, including testing photovoltaic cells or optical sen- sors, printing, additive manufacturing and micro-electronic metrology and inspection systems used to manufacture micro-electronic devices. By micro-electronic devices it is meant semiconductor devices, including integrated circuits (ICs), and Micro-Electromechanical System or MEMS devices.

In conclusion it has been found that using a 'true' GLV™ in a spectral shaping system eliminates lateral gaps between reflective surface of stationary and active ribbons, thereby increasing wherein a $0^{th}$-order contrast of the system when illuminated by a broadband light source. In particular, it has been found the spectral shaping system described herein can provide a $0^{th}$-order ANSI (American National Standards Institute) contrast between pixels in a fully reflective and an extinguished state greater than at least 100:1.

Thus, a system and method for spectral shaping of a broadband source using a MEMS-based dynamically adjust- able diffraction grating including a plurality of electrostati- cally deflectable reflective active ribbons suspended over a reflective surface of a substrate, wherein each of the active ribbons are separated by a distance equal to a width of the active ribbons, and without static bias ribbons therebetween, have been disclosed. Embodiments of the present invention have been described above with the aid of functional and schematic block diagrams illustrating the implementation of specified functions and relationships thereof. The boundar- ies of these functional building blocks have been arbitrarily defined herein for the convenience of the description. Alter- nate boundaries can be defined so long as the specified functions and relationships thereof are appropriately per- formed.

The foregoing description of the specific embodiments will so fully reveal the general nature of the invention that others can, by applying knowledge within the skill of the art, readily modify and/or adapt for various applications such specific embodiments, without undue experimentation, without departing from the general concept of the present invention. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

It is to be understood that the Detailed Description section, and not the Summary and Abstract sections, is intended to be used to interpret the claims. The Summary and Abstract sections may set forth one or more but not all exemplary embodiments of the present invention as contemplated by the inventor(s), and thus, are not intended to limit the present invention and the appended claims in any way.

The breadth and scope of the present invention should not be limited by any of the above-described exemplary embodiments, but should be defined only in accordance with the following claims and their equivalents.

What is claimed is:

1. A spectral shaping system comprising:
a broadband light source to generate a light including an input beam having a plurality of wavelengths;
a dispersive element to receive and disperse the input beam into a number of dispersed beams separated by wavelength, the dispersive element comprising a prism;
a spatial light modulator (SLM) comprising a linear array of a plurality of active ribbons suspended over a reflective surface of a substrate each of the plurality of active ribbons having a reflective top surface; and
optic elements including a number of lenses or mirrors to direct the number of dispersed beams onto the SLM at an acute angle of incidence relative to a long axis of the linear array,
wherein the SLM is operable to selectively modulate the number of dispersed beams incident thereon by diffracting at least one beam of the number of dispersed beams by destructive interference between light reflected from reflective top surface of a number of plurality of active ribbons and laterally adjacent portions of the reflective surface of the substrate, and reflecting a remainder of the number of dispersed beams as $0^{th}$-order light, and
wherein the optic elements are further operable to pass the $0^{th}$-order light reflected by the SLM to the dispersive element, the dispersive element is further operable to recombine the reflected dispersed beams to form a reflected beam directed toward an optical output of the spectral shaping system.

2. The spectral shaping system of claim 1 wherein each of the plurality of active ribbons separated from at least one adjacent active ribbon by a distance equal to a width of each of the plurality of active ribbons, and the reflective top surface each of the plurality of active ribbons and an area of the reflective surface of the substrate exposed between adjacent active ribbons are sized and shaped to define substantially equal areas.

3. The spectral shaping system of claim 2 wherein the linear array is divided into a plurality of pixels, each pixel including a number of the plurality of active ribbons and adjacent areas of the reflective surface of the substrate, wherein each of the number of dispersed beams is modulated by one or more of the pixels.

4. The spectral shaping system of claim 1 wherein a $0^{th}$-order contrast of the system is greater than at least 100:1.

5. The spectral shaping system of claim 1 wherein the broadband light source is operable to generate light having wavelengths between 200 nm-2 μm, or a subset thereof.

6. The spectral shaping system of claim 1 wherein the SLM is enclosed in a wafer level package including a window through which the number of dispersed beams and reflected dispersed beams are passed, and wherein the window is tilted relative to a plane of the SLM, allowing separation of the reflected dispersed beams from the SLM and a reflection of the number of dispersed beams from the window.

7. The spectral shaping system of claim 6 wherein the window includes an anti-reflective coating.

8. A method of spectrally shaping light comprising:
generating light including a plurality of wavelengths;
dispersing the input beam into a number of dispersed beams separated by wavelength using a dispersive element, the dispersive element comprising a prism;
directing the number of dispersed beams onto a plurality of pixels of a spatial light modulator (SLM) comprising a linear array of a plurality of active ribbons suspended over a reflective surface of a substrate at an acute angle of incidence relative to a long axis of the linear array;
individually controlling each pixel of the SLM to selectively modulate the number of dispersed beams incident thereon by diffracting at least one beam of the number of dispersed beams by destructive interference between light reflected from reflective top surface of a number of plurality of active ribbons and laterally adjacent portions of the reflective surface of the substrate, and reflecting a remainder of the number of dispersed beams as $0^{th}$-order light;
transmitting the $0^{th}$-order light of the reflected dispersed beams through the dispersive element to recombine the reflected dispersed beams to form a reflected beam; and
directing the reflected beam to an optical output of the spectral shaping system.

9. The method of claim 8 wherein each of the plurality of pixels comprises a number of the reflective active ribbons suspended over the reflective surface of the substrate and separated from one another by a distance equal to a width of each of the number of reflective active ribbons, and the number of reflective active ribbons are operable to be electrostatically deflected to bring light of the dispersed beam directed onto the pixel and reflected from the number of reflective active ribbons and light reflected from adjacent areas of the reflective surface of the substrate in the pixel into interference, and individually controlling each pixel of the SLM comprises a voltage between ribbon electrodes in each of the number of reflective active ribbons and a substrate electrode in the substrate to deflect the active ribbons.

10. The method of claim 9 wherein each of the number of dispersed beams is modulated by one or more of the pixels.

11. The method of claim 9 wherein individually controlling each pixel of the SLM to selectively modulate the number of dispersed beams comprises setting each pixel to a fully reflective or fully extinguished quiescent state based on a wavelength of a dispersed beam incident thereon by applying a wavelength dependent calibration voltage.

12. The method of claim 9 wherein generating light comprises generating light including a plurality of wavelengths between 200 nm-2 μm, or a subset thereof.

13. The method of claim 9 wherein a $0^{th}$-order contrast of the system is greater than at least 100:1.

14. A spectral shaping system comprising:
a broadband light source to generate a light including an input beam having a plurality of wavelengths;

a dispersive element to receive and disperse the input beam into a number of dispersed beams separated by wavelength, the dispersive element comprising a prism;

a spatial light modulator (SLM) comprising a linear array of a plurality of active ribbons suspended over a reflective surface of a substrate; and a collimating element to receive and direct the number of dispersed beams onto a spatial light modulator (SLM), wherein the SLM is operable to selectively modulate the number of dispersed beams incident thereon by diffracting at least one beam of the number of dispersed beams by destructive interference between light reflected from reflective top surface of a number of plurality of active ribbons and laterally adjacent portions of the reflective surface of the substrate, and reflecting a remainder of the number of dispersed beams as $0^{th}$-order light, and wherein the collimating element is further operable to pass the $0^{th}$-order light reflected by the SLM to the dispersive element at an acute angle of incidence relative to a long axis of the linear array of the SLM, and the dispersive element is further operable to recombine the reflected dispersed beams to form a reflected beam directed toward an optical output of the spectral shaping system.

15. The spectral shaping system of claim 14 wherein each of the plurality of active ribbons comprise a reflective top surface, and are separated from at least one adjacent active ribbon by a distance equal to a width of each of the plurality of active ribbons, and wherein the reflective top surface each of the plurality of active ribbons and an area of the reflective surface of the substrate exposed between adjacent active ribbons are sized and shaped to define substantially equal areas.

16. The spectral shaping system of claim 15 wherein the linear array of the SLM is divided into a plurality of pixels, each pixel including a number of the plurality of active ribbons and adjacent areas of the reflective surface of the substrate, wherein each of the number of dispersed beams is modulated by one or more of the pixels.

17. The spectral shaping system of claim 14 wherein the wherein the collimating element comprises a collimating mirror.

18. The spectral shaping system of claim 14 wherein a $0^{th}$-order contrast of the system is greater than at least 100:1.

* * * * *